United States Patent
Hanke

(10) Patent No.: US 7,025,414 B2
(45) Date of Patent: Apr. 11, 2006

(54) OPENING VEHICLE ROOF

(75) Inventor: Michael Hanke, Pullach (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 106 days.

(21) Appl. No.: 10/488,506

(22) PCT Filed: Aug. 31, 2002

(86) PCT No.: PCT/EP02/09756

§ 371 (c)(1),
(2), (4) Date: Mar. 3, 2004

(87) PCT Pub. No.: WO03/024730

PCT Pub. Date: Mar. 27, 2003

(65) Prior Publication Data

US 2004/0232737 A1 Nov. 25, 2004

(30) Foreign Application Priority Data

Sep. 19, 2001 (DE) .................... 101 46 284

(51) Int. Cl.
*B60J 7/05* (2006.01)
*B60J 7/185* (2006.01)

(52) U.S. Cl. .................... 296/221; 296/224

(58) Field of Classification Search ................ 296/221, 296/224
See application file for complete search history.

(56) References Cited

U.S. PATENT DOCUMENTS

| | | | | |
|---|---|---|---|---|
| 4,647,105 A | * | 3/1987 | Pollard | 296/221 |
| 4,684,169 A | * | 8/1987 | Igel et al. | 296/221 |
| 4,725,092 A | * | 2/1988 | Reintges et al. | 296/221 |
| 5,028,090 A | * | 7/1991 | Huyer | 296/221 |
| 5,092,651 A | | 3/1992 | Baldwin et al. | |
| 5,275,461 A | | 1/1994 | Cheron et al. | |
| 5,580,123 A | * | 12/1996 | Ochiai | 296/223 |
| 5,593,204 A | | 1/1997 | Wahl et al. | |
| 6,390,544 B1 | * | 5/2002 | Manders et al. | 296/223 |

FOREIGN PATENT DOCUMENTS

DE 196 23 945 C1 7/1997

* cited by examiner

*Primary Examiner*—Dennis H. Pedder
(74) *Attorney, Agent, or Firm*—Nixon Peabody LLP; David S. Safran

(57) ABSTRACT

Vehicle roof with at least one cover, which, by means of a lifting and closing mechanism, selectively closes a roof opening, or at least partly opens the same by lifting the rear edge of the cover, or by displacement along a guide rail, and a locking element (28) which locks the cover or a component connected thereto (cover support 6) relative to the guide rail (14) in the closed position, or in the lifted position. The locking element (28) is thus arranged on a locking lever (24), arranged on the cover or a component connected thereto so as to pivot essentially in a vertical plane. The locking element (28) is taken out of engagement with a locking recess (14*f*) on the guide rail (14), by means of a carrier device, at the end of a dropping movement of the cover, preceding the displacement of the cover into an open position.

13 Claims, 6 Drawing Sheets

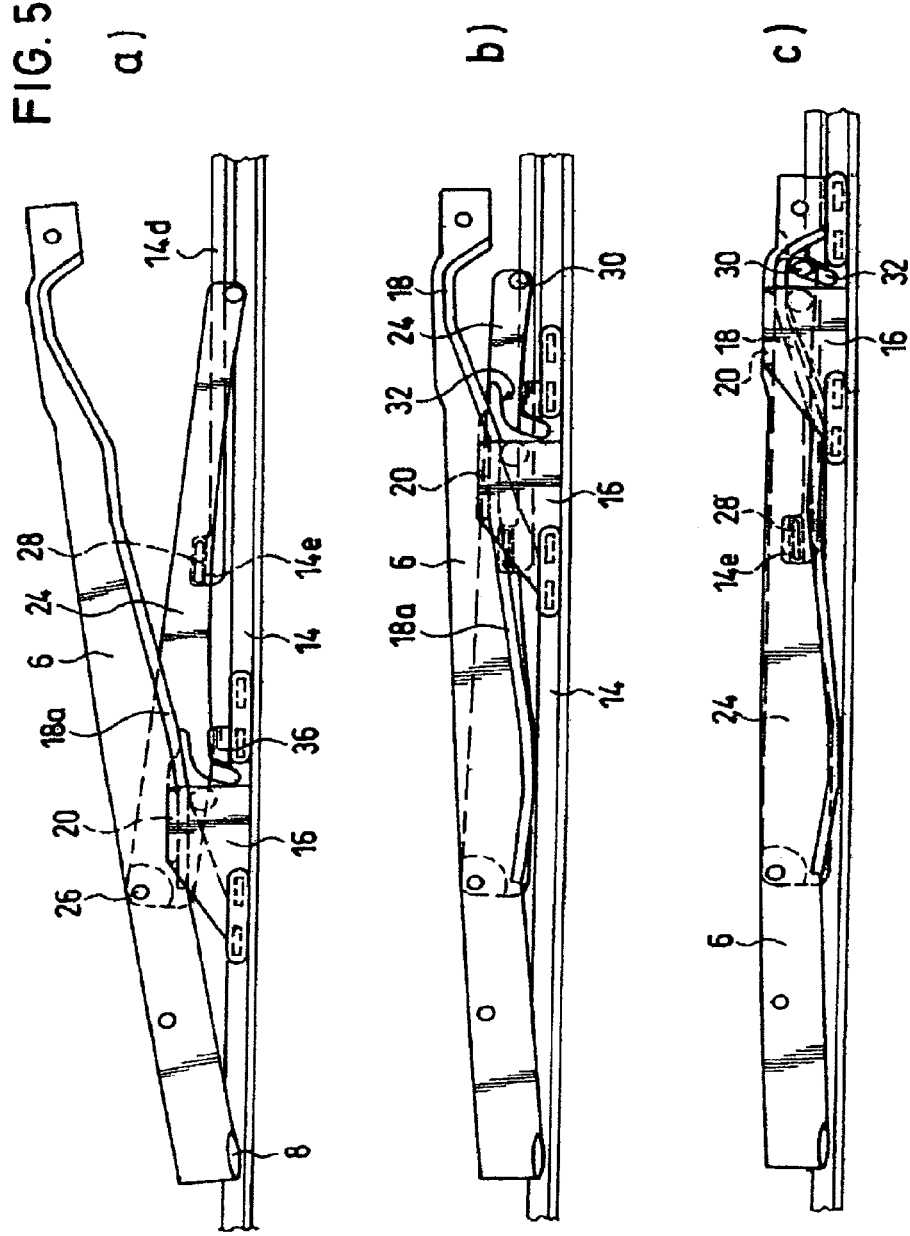

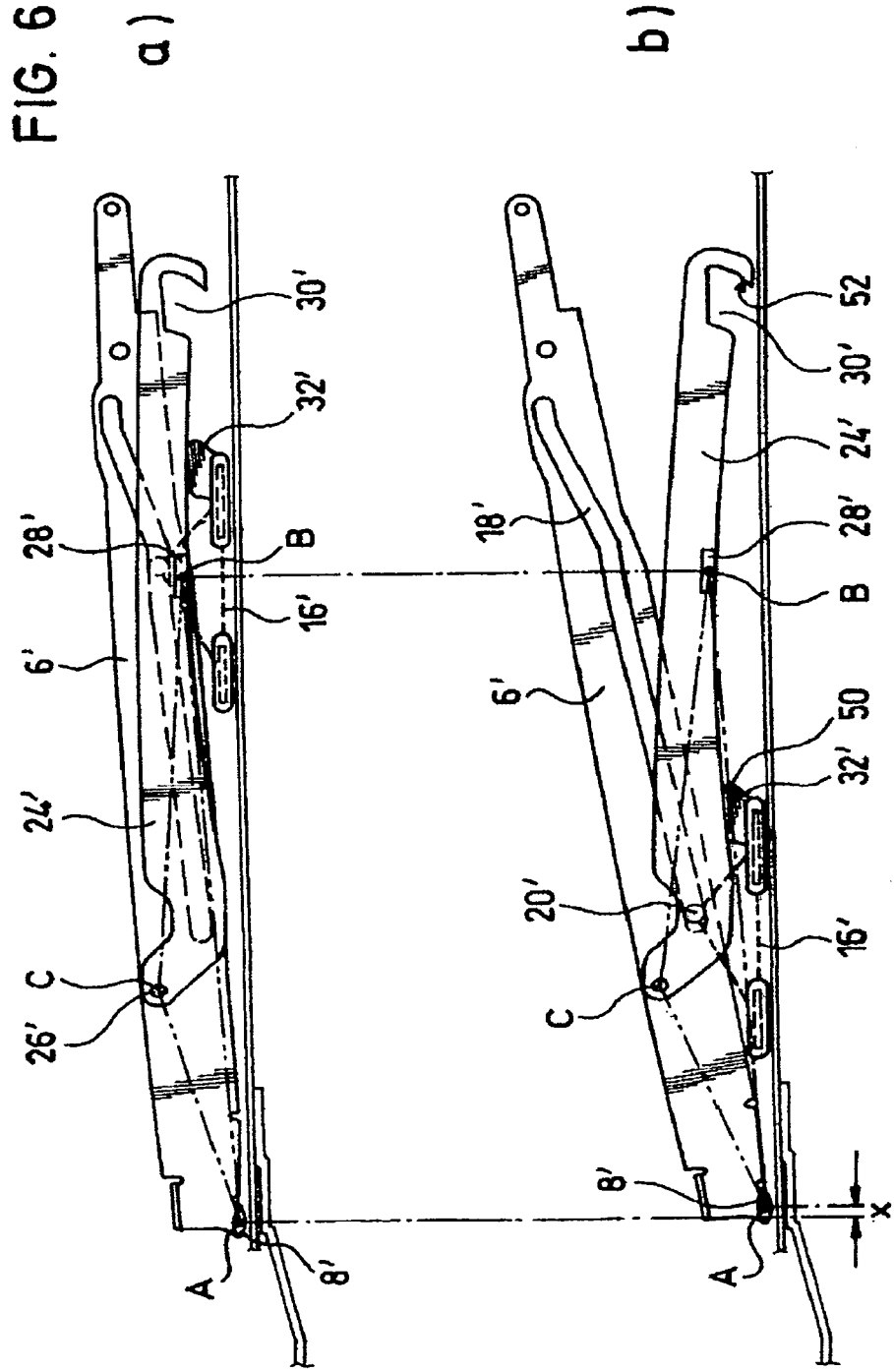

OPENING VEHICLE ROOF

BACKGROUND OF THE INVENTION

1. Field of the Invention

The invention relates to an openable motor vehicle roof with at least one cover which is supported to be able to slide in the x direction in the area of its front edge in a guide rail and to be able to pivot around a pivot axis which is oriented in the y-direction, a raising and sliding mechanism being provided by which the at least one cover is selectively either closes a roof opening (closed position) or at least partially clears the opening by raising of the cover at its rear edge (ventilation position) or by sliding the cover along a guide rail (open position), and with a locking element which locks the cover or a component connected to it to the guide rail in the closed position and in ventilation position.

2. Description of Related Art

The raising and sliding mechanism for a roof cover generally comprises a drive carriage which can be moved along a guide rail located along each side edge of the roof opening, which carriage is coupled via a link-like arrangement to a lever-like cover carrier located permanently in a forward area of the cover or one made integrally with it. The cover carrier is supported to be able to slide and swivel in the guide rail via a sliding block located on its front end. As long as the cover is not moved to the rear into the open position, it is locked in the X-direction (according to the coordinate system in FIG. 1) via a locking element. In this state, the drive carriage moves relative to the cover carrier and displaces it (and thus, the cover) between the ventilation position, via the closed position, into, for example, a lowered position below the roof plane as a stage preliminary to sliding of the cover into the open position. The locking element is then moved into the unlocked position, and the drive carriage is coupled to the cover carrier so that it, and thus the cover, are entrained to the rear into the open position as the drive carriage continues to move.

Published German Patent Application DE 34 44 522 A1 corresponds to U.S. Pat. No. 4,684,169 discloses a motor vehicle roof in which there is a catch hook which is preloaded elastically in the engagement position to the guide rail on the front sliding block of a sliding and lifting roof mechanism which is disengaged from the cover or a part connected to it when the cover is lowered before sliding under the fixed motor vehicle roof. With such a catch hook, complex adjustment relative to the cover or the part connected to it is necessary to ensure proper operation.

SUMMARY OF THE INVENTION

A primary object of the invention is to devise an openable motor vehicle roof in which simple, reliable and low-wear locking and unlocking of the raising and sliding mechanism is enabled.

This object is achieved by a motor vehicle roof in which the locking element is located on a locking lever which is located essentially in a vertical plane (x-z plane) so as to be able to pivot on the cover, or on the component which is connected to the cover, and where the locking element can be controlled by the raising and sliding mechanism such that, during the sliding motion of the cover, it is able to slide along the guide rail, and during the pivoting motion of the cover, it is locked relative to the guide rail Simple, reliable, and moreover, low-wear locking and unlocking of the raising and sliding mechanism are achieved by the arrangement of the locking element on the locking lever which is able to pivot on the cover, or on a component connected to the cover, and by the possibility of locking the locking element relative to the guide rail.

Providing a locking lever for holding the locking element also enables other advantageous embodiments and functions of the motor vehicle roof. One problem which occurs in motor vehicle roofs of the generic type is that, when the cover is raised, its front edge executes a pivoting motion around the pivot point of the cover carrier which generally lies behind and under this front edge; this results in the front edge of the cover moving downward and forward. In this way, the seal which is located on the front edge of the cover is compressed relatively strongly so that it must have a correspondingly large-volume cross section which allows the compression; this leads to a correspondingly wide gap between the front edge of the cover and the front edge of the roof opening. Since the seal generally has a cross-sectional shape which remains the same over the entire periphery of the cover, the gaps are also comparatively large on the sides and on the rear edge of the cover.

To solve this problem, according to another aspect of the invention, it is provided that the locking lever is located on the cover carrier at a coupling point which is spaced away from the front bearing point of the cover carrier, for example, shifted to the rear. In this way, when the cover is raised into its ventilation position, the coupling point of the locking lever is moved such that the front bearing point of the cover carrier, the coupling point of the locking lever and the locking element which is locked in the guide rail form a triangle. By raising the coupling point when the cover is raised, the base side formed by the front bearing point of the cover carrier and the locking element is shortened; since the locking element is fixed, the front bearing point of the cover carrier is pulled back, and thus, the seal on the front edge of the cover lifts off the front edge of the roof opening. This measure makes it possible to use a seal with a comparatively small volume in cross section.

According to another aspect of the invention, it is provided that the locking element is guided by a driver means (link pin, link groove) located on the locking lever towards the end of the sliding motion of the cover out of its open position in the direction of its closed position engaged to a catch recess of the guide rail. This construction is especially simple and reliable.

The locking lever in one preferred embodiment of the invention is located directly on the above described, lever-like cover carrier which is permanently connected to the cover so that a separate holding bracket or the like is not necessary for the locking lever.

For adjustment of the locking element between its locked and it unlocked position, for example, any construction is suitable by which the locking lever is moved toward the end of the pivoting motion of the cover out of its ventilation position into the closed position or into the sliding position, such that the locking element is guided out of the assigned catch recess, and thus, is released to the rear for movement along the guide rail. Here, it is fundamentally possible for the cover carrier which is joining in the pivoting motion of the cover, or the drive carriage which is moved to the rear in this pivoting motion, to fit into the driver means and to move the locking lever.

A structurally simple and reliable embodiment provides for the driver means to comprise a first link element which is located on the free end of the locking lever and which interacts with a second link element which is located on the drive carriage. The first link element can be for example a link pin which is essentially parallel to the pivot axis of the locking lever and which interacts with a link groove which forms the second link element and which is provided on the drive carriage. The arrangement formed by the link pin and the link groove is made such that the locking element is routed out of the catch recess before sliding motion of the cover into the open position, but towards the end of the sliding motion into the closed position it is inserted again into the catch recess.

According to one embodiment of the invention, the locking element is a catch which projects laterally from the locking lever and which fits during the sliding motion of the cover into the guide groove of the guide rail, the catch recess being formed by a widening which is made in the guide edge of the guide groove, and into which the catch can fit when the cover is being moved between the closed position and the ventilation position.

In one embodiment of the invention, the catch recess is made on the upper guide edge of the guide groove so that the locking lever must be swung up for insertion of the locking element into the catch recess and down for guiding it out; the link groove which forms the second link element is then formed by a groove which is open towards the rear of the drive carriage with a first section which extends essentially forward, and a second, following section which extends essentially forward/down.

In order to support insertion of the locking element into the catch recess, the catch recess has a profile on its front edge which is matched to the motion of the locking element when the latter enters the catch recess.

In order to hold the locking lever in its locked position during the traveling motion of the drive carriage out of the position which corresponds to the closed position of the cover into the position which corresponds to the ventilation position, the drive carriage has a support bracket which supports the locking lever from underneath, the locking lever on its lower edge being profiled such that, during this entire path of the drive carriage, the locking lever is pressed up into its locking position.

The link arrangement which couples the cover carrier to the drive carriage in one preferred embodiment comprises at least one link bridge which projects on a side surface of the cover carrier and a grip section which extends around the link bridge and which is made on the drive carriage. Especially stable and tilt-free engagement of this link arrangement is obtained when the cover carrier has a cross-sectional profile that is essentially in the form of an inverted T with two side link bridges which are flush with the lower edge of the cover carrier, the grip section of the drive carriage having an essentially T-shaped groove which is complementary to the cross-sectional shape of the cover carrier. This embodiment enables an especially low configuration of the cover carrier since the lower edges of the link bridges which form the actual link path at the same time form the lower edge of the cover carrier; in link slots which must be surrounded by a material with sufficient thickness this is not possible.

According to another embodiment of the invention, the drive carriage can be coupled to a drive cable, on the drive carriage-side end of the drive cable, there being a catch which projects transversely to the lengthwise axis of the cable and which can be inserted into a pocket which has been formed on a side of the drive carriage. In this way, the drive cable which runs in its own channel of the guide rail and the guide carriage move laterally against one another so that equalization of the tolerance with lateral guidance inaccuracies of the drive carriage is possible.

Several embodiments of the invention are shown in the drawings and are explained in detail below.

BRIEF DESCRIPTION OF THE DRAWINGS

FIGS. 5a, 5b & 5c are side views of the lifting and sliding mechanism as shown in FIGS. 2 to 4 in different adjustment phases; and FIGS. 6a & 6b are side views of another embodiment of a raising and sliding mechanism in two different positions.

DETAILED DESCRIPTION OF THE INVENTION

Figure 1:
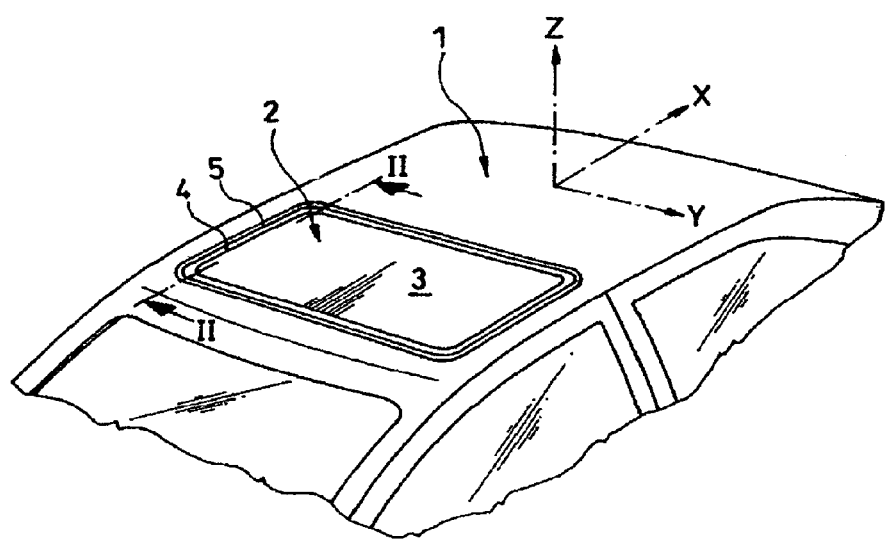
FIG. 1 is a schematic perspective top view of the motor vehicle roof.

The motor vehicle roof 1 which is shown in FIG. 1 has a cover 2 by means of which a roof opening 3 can be selectively closed or at least partially cleared. The cover 2 is preferably made as a transparent pane which is surrounded by the cover frame 4, which is preferably made of plastic, and a peripheral cover seal 5 which is attached to the cover frame 4. The cover 2 can be raised in the conventional manner, around a raising axis which lies in the area of its front edge (ventilation position) or can be lowered to under the motor vehicle roof 1 (sliding position) and can be pushed to the rear (open position), which is therefore not shown.

To carry out the raising and sliding motion, generally, on either side of the cover 2, there is a respective raising and sliding mechanism, of which the raising and sliding mechanism which is assigned to the right side of the cover 2, for example, is shown and is described below.

Figure 2:
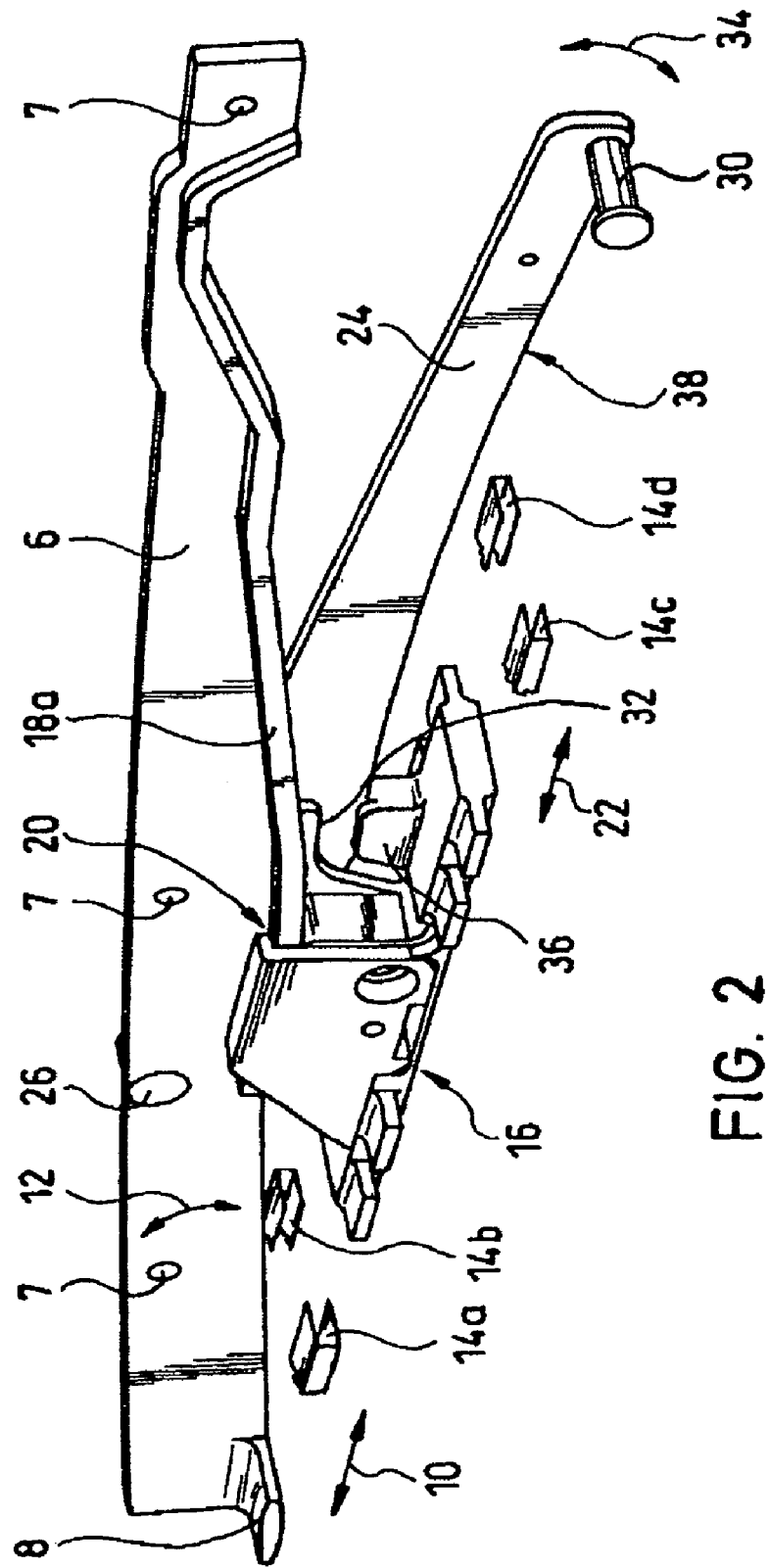
FIG. 2 is a partially exploded perspective view of the lifting and sliding mechanism for a cover in the direction of the arrows of the section line II—II of FIG. 1.
Figure 3:
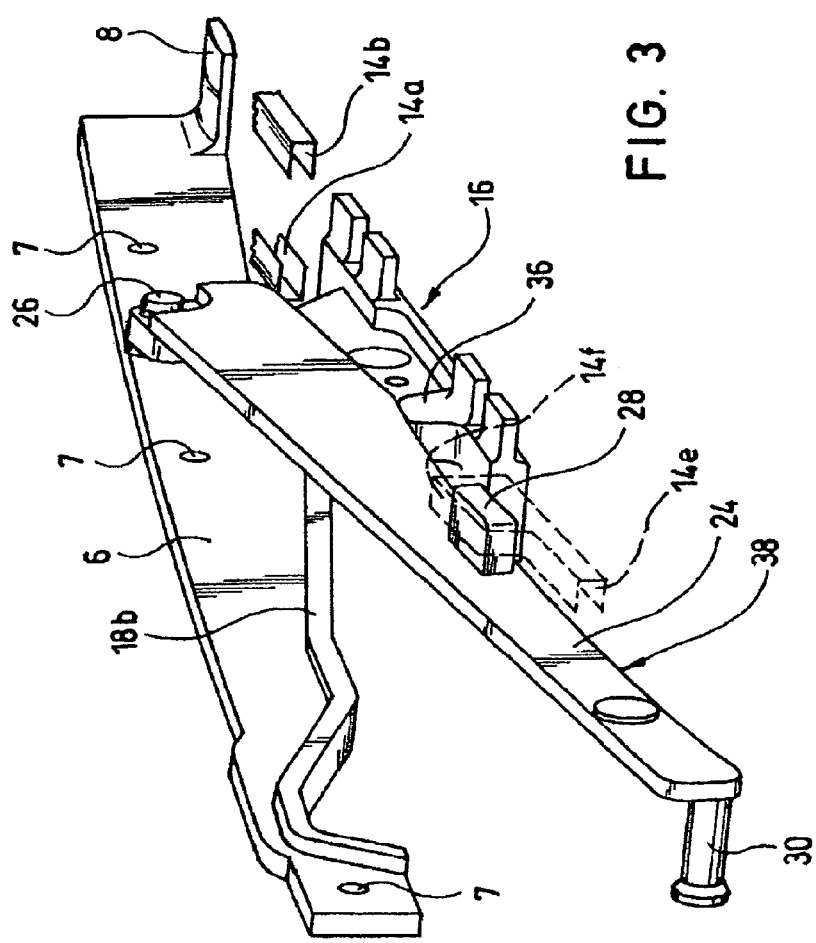
FIG. 3 is a partially exploded perspective view of the raising and sliding mechanism of FIG. 2 in a view roughly from the opposite side.

As FIGS. 2 & 3 show, the raising and sliding mechanism comprises essentially a lever-like cover carrier 6 which is attached to the bottom of the cover 3 (not shown in these figures) via holes 7 and fasteners which fit into them. The cover carrier can be moved via a sliding block 8 which is located on its front end in assigned guide grooves 14a, 14b of a guide rail 14 (only segments of which are shown in these figures) in the direction of the double arrow 10 (in the x direction according to the coordinate system in FIG. 1) and is supported to be able to pivot in the directions of the double arrow 12. In the example of FIGS. 2 & 3, the sliding blocks 8 are made crowned so that, in a lengthwise guide which is free of play with respect to the z direction (see the coordinate system in FIG. 1), the blocks also allow a pivoting motion according to a certain pivot angle.

The cover carrier 6 is coupled via a link arrangement to a drive carriage 16 which can be moved along the guide grooves 14c, 4d. For this purpose, the cover carrier 6 has laterally projecting link bridges 18a, 18b along its lower edge which fit into a grip section 20 on the upper area of the drive carriage 16. The grip section 20 has an inside shape which is essentially complementary to the cross section of the cover carrier 6 in the area of the link bridges so that the cover carrier 6 is guided by the drive carriage 16 without play. To do this, the grip section 20—as shown in detail in FIG. 4—has two guide bridges 20a, 20b which extend over the respective link bridges 18a, 18b and a support bracket 20c which supports the cover carrier 6 from underneath.

The link bridges 18a, 18b, in a conventional manner, run such that, when the drive carriage 16 is moved in the direction of the double arrow 22, the cover carrier 6 is moved out of the position which is shown in FIGS. 2 & 3 and which corresponds to the ventilation position of the cover, via a position which corresponds to the closed position, into the lowered position which corresponds to the sliding position and back, as is explained in further detail below.

On the cover carrier 6, a locking lever 24 is pivotally supported at a coupling point 26 which lies behind the sliding blocks 8 in the vertical plane (x-z plane). The locking lever 24, on its side surface facing away from the cover carrier 6, bears a locking element 28. The locking element 28 is formed by a catch which projects laterally from the locking lever and which fits into its own guide groove 14e of the guide rail 14 and can be moved in it. The guide groove 14e upwardly widens on its front end to a catch recess 14f, into which the locking element 28 can fit, for locking the locking lever 24 and the cover carrier 6 connected to it against displacement along the guide rail 14.

In order to pivot the locking lever 24, and thus, to insert the locking element 28 into the catch recess 14f, or guide it out of it, there is a driver means on the locking lever 24 which interacts with the drive carriage 16. The driver means comprises a link pin 30 which is located on the free end of the locking lever 24, which is essentially parallel to the swivelling axis of the locking lever 24, and which interacts with a link groove 32 which is made on the end of the drive carriage 16 facing the link pin 30 in order to swivel the locking lever 24 in the direction of the double arrow 34 (FIG. 2), as is described more fully below.

As is further apparent from FIGS. 2 & 3, the locking lever 24 is supported from below by a support bracket 36 on the drive carriage 16; the contour 38 on the bottom of the locking lever 24 is made such that the locking lever 24, during the entire path of motion of the drive carriage 16 relative to the locking lever 24 is pressed up into a position in which the locking element 28 has been swung up into the catch recess 14f due in part to the effect of movement of the coupling point 26 of the locking lever 24 on cover carrier 6, which coupling point moves with movement of the cover carrier 6.

The driving of the drive carriage 16 along the guide rail 14 takes place in a conventional manner by means of a tension and compression resistant cable 40 (see FIG. 4) which is connected to a suitable drive (not shown), for example, to an electric motor. The driver fitting 42 is attached to the end of the cable 40 assigned to the drive carriage 16 and has a laterally projecting catch 44 which is inserted in the y direction into a pocket 46 of the drive carriage 16. This connection allows movement of the driver fitting 42 relative to the drive carriage 16 in the lateral direction (in the y direction according to the coordinate system in FIG. 1) so that tolerance inaccuracies can be equalized in the lateral guidance of the drive carriage 16.

Figure 4:
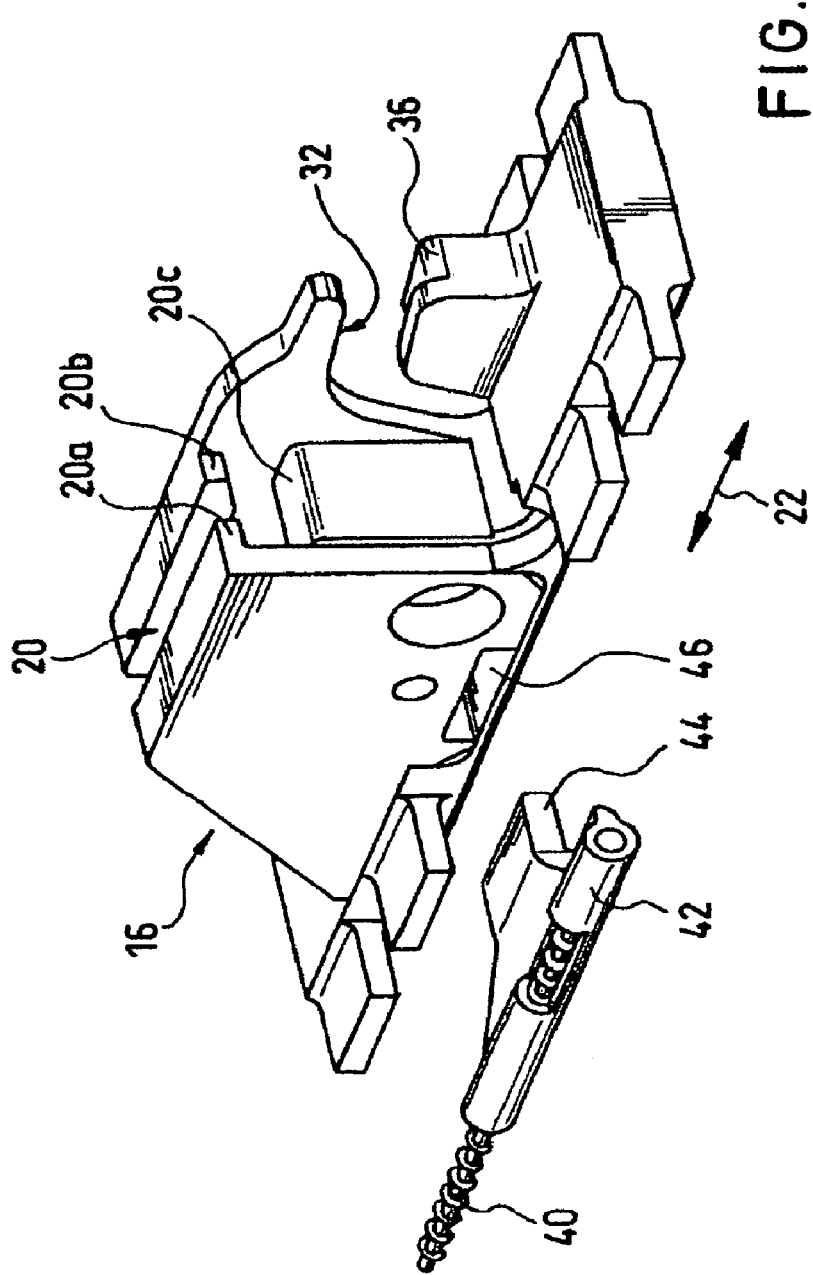
FIG. 4 is a partially exploded perspective view a drive carriage for actuating the lifting and sliding mechanism of FIGS. 2 and 3.

FIG. 5 shows the raising and sliding mechanism of FIGS. 2 to 4 in different phases of motion.

FIG. 5a corresponds roughly to the position which is shown in FIGS. 2 & 3 and which corresponds to the ventilation position of the cover 2. The drive carriage 16 is moved completely forward, and thus, has raised the cover carrier 6 up by means of the link arrangement formed by the grip section 20 and the link bridges 18, i.e., it has pivoted around the pivot point which has been formed by the sliding blocks 8. The locking lever 24 is pressed up by its contour 38 in interaction with the support bracket 36 formed on the drive carriage 16 so that the locking element 28 is pressed into the catch recess 14f which branches upward from the guide groove 14d. In this way, the arrangement formed of the cover carrier 6 and the locking lever 24, and thus the cover 2, are locked in the lengthwise direction (x direction).

In FIG. 5b, the drive carriage 16 has moved to the rear, by the interaction of the grip section 20 of the drive carriage 16 with the link bridges 18, the cover carrier 6 having been swung down into the position which closes the roof opening 3.

As the drive carriage 16 continues to move to the rear, the cover carrier 6 continues to pivot downward by the interaction of the grip section 20 with the link bridges 18 such that the cover 2, which is connected to the cover carrier 6, travels into the position which is lowered to below the roof plane. At the same time, the link pin which is located at the end of the locking lever 24 enters the link groove 32 on the drive carriage 16, as is shown in FIG. 5c. As the drive carriage 16 continues to slide to the rear (not shown), the link pin 30 is deflected further down in the link groove 32, by which the locking element 28 is guided out of the catch recess 14f and is guided into the assigned guide groove 14d. Therefore, as the drive carriage 16 continues to move to the rear the arrangement formed of the cover carrier 6 and the locking lever 24 can be entrained by the drive carriage via the link pin 30 and the link groove 32 so that the cover 2 travels into the open position.

When the drive carriage 16 is again moved forward, it first entrains the locking lever 24, and thus the cover carrier 6, via the link pin 30 and the link groove 32 so that it moves forward until the locking element 28 is opposite the catch recess 14f. Because the link groove 32 runs obliquely, the link pin 30 is continuously pressed upward so that the locking element 28 then enters the catch recess 14f. Thus, the arrangement of the cover carrier 6 and the locking element 24 are locked in the lengthwise direction relative to the guide rail. As the drive carriage 16 continues to move forward, conversely to the above described process, first the cover carrier 6 is moved up into the closed position shown in FIG. 5b and afterwards into the ventilation position which is shown in FIG. 5a. In this last phase of motion, at the same time, the front sliding block 8 of the cover carrier 6 is moved to the rear by a certain small amount (cover return) so that the seal located on the front edge of the cover 2 is raised against the front edge of the roof opening 3, as was described above.

This effect of cover return is explained using FIG. 6 which shows a similar arrangement to FIG. 5, with a cover carrier 6', a locking lever 24' and a schematically shown drive carriage 16'. FIG. 6a shows the raising and sliding mechanism in a position which corresponds to FIG. 5b, i.e., the cover carrier 6' is located in the position which corresponds to the closed position of the cover 2. The locking element 28' is located in the locked position.

The point A which has been formed by the front sliding block 8' of the cover carrier 6', the point B formed by the locking element 28' and the point C formed by the coupling point 26' form a flat triangle with sides AC and BC which are constant, while the side AB is variable. When the drive carriage 16' is moved forward, in order to raise the cover 2, the point C is raised, the side AB having to be shortened. Since the point B is a fixed point relative to the fixed motor vehicle roof 1 and relative to the guide rail 14, the point A is moved to the rear by the amount x. This is the amount of the desired cover return. This amount x can be varied by a suitable choice of the coupling point 26' on the cover carrier 6'.

FIG. 6 shows, moreover, a configuration of the raising and sliding mechanism which has been modified relative to FIGS. 2 to 5. The link arrangement which couples the cover carrier 6' to the drive carriage 16' is formed, in this case, by a link slot 18' which is made in the cover carrier 6' and into which a link pin 20' which is located on the drive carriage 16' fits. The function of this link arrangement otherwise corresponds to the function of the link bridge 18 and of the grip section 20 which was described relative to FIGS. 2 to 5.

The driver means for moving the locking lever 24' is formed essentially of a cam 32' on the drive carriage 16', which supports the locking lever 24 from underneath, and which fixes it in a position which is swung up and in which the locking element 28' is located in the assigned catch recess. When the drive carriage 16' reaches the position in which the locking element is to be guided out of the catch recess, the cam 32', with its cam surface 50 which is made on its back, runs against a cam surface 52 which is made on the back end of the locking lever 24 and guides the cam 32' into a recess 30', by which the locking element 24 is swung down and the locking element 28' is guided out of the assigned catch recess.

In order to achieve "plunging-through motion" of the cover when it is being moved out of the ventilation position into the closed position, the rear edge of the cover first being lowered to under the roof plane and then moved into the closed position from underneath, the link bridge can have a corresponding section called a saddle (not shown). The same effect can be achieved via electrical triggering by the cover being moved beyond the closed position somewhat into the lowered position before the sliding position and back again. This results in the seal being deflected down on the back edge of the cover in the closed position; this improves the sealing action.

What is claimed is:

1. Openable motor vehicle roof, comprising:
    a fixed roof surface with a roof opening therein,
    a guide rail,
    a raising and sliding mechanism,
    at least one cover which is supported to slide in a guide rail in an x direction in an area of its front edge and to pivot around a pivot axis which is oriented in a y-direction, said at least one cover being selectively movable by said raising and sliding mechanism into a closed position in which the at least one cover closes the roof opening, a ventilation position in which a rear edge of the at least one cover is raised, and an open position in which the at least one cover is slid along the guide rail to at least partially clears the roof opening,
    a locking element which locks the at least one cover relative to the guide rail in the closed position and the ventilation position,
    wherein the locking element is located on a locking lever which is located essentially in a vertical plane to pivot on a cover carrier which is permanently connected to the cover, and
    wherein the locking element is controllable by the raising and sliding mechanism such that it is released to enable the at least one cover is able to slide along the guide rail to and from the closed position and the open position and is engaged during motion of the at least one cover from the closed position to and from the ventilation position.

2. Motor vehicle roof as claimed in claim 1, wherein the locking lever is located at a coupling point that is spaced away from a front bearing point of the cover such that a distance between the front bearing point of the cover and the locking element is shortened when the locking element is locked and the cover is pivoted.

3. Motor vehicle roof as claimed in claim 1, wherein a driver means is located on the locking lever for causing engagement of the locking element in a catch recess of the guide rail towards the end of sliding motion of the cover from the open position toward the closed position.

4. Motor vehicle roof as claimed in claim 3, wherein, a front end of the cover carrier being supported to slide and pivot in the guide rail, and wherein the locking lever is coupled via a link arrangement to a drive carriage raising and sliding mechanism which is movable along the guide rail.

5. Motor vehicle roof as claimed in claim 3, wherein the driver means comprises a first link element which is located on the free end of the locking lever and which interacts with a second link element which is located on the drive carriage.

6. Motor vehicle roof as claimed in claim 5, wherein the first link element is a link pin which is essentially parallel to the pivot axis of the locking lever and wherein the second link element is formed by a link groove on the drive carriage.

7. Openable motor vehicle roof, comprising:
    a fixed roof surface with a roof opening therein,
    a guide rail,
    a raising and sliding mechanism,
    at least one cover which is supported to slide in a guide rail in an x direction in an area of its front edge and to pivot around a pivot axis which is oriented in a y-direction, said at least one cover being selectively movable by said raising and sliding mechanism into a closed position in which the at least one cover closes the roof opening, a ventilation position in which a rear edge of the at least one cover is raised, and an open position in which the at least one cover is slid along the guide rail to at least partially clears the roof opening,
    a locking element which locks the at least one cover relative to the guide rail in the closed position and the ventilation position,
    wherein the locking element is located on a locking lever which is located essentially in a vertical plane to pivot on a component which is connected to the cover,
    wherein the locking element is controllable by the raising and sliding mechanism such that it is released to enable the at least one cover is able to slide along the guide rail to and from the closed position and the open position and is engaged during motion of the at least one cover from the closed position to and from the ventilation position;
    wherein the locking element is a catch which projects laterally from the locking lever and which fits into a catch recess of a guide groove of the guide rail, and wherein the catch recess is formed by a widening which is made in a guide edge of the guide groove.

8. Motor vehicle roof as claimed in claim 7, wherein the guide edge is an upper guide edge of the guide groove, and wherein the link groove is a groove which is open towards the rear of the drive carriage and has a first section which extends essentially forward, and a second, following section which extends essentially forward and downward.

9. Motor vehicle roof as claimed in claim 7, wherein the catch recess has a profile on its front edge which is matched to the motion of the locking element when the locking element enters and emerges from the catch recess.

10. Motor vehicle roof as claimed in claim 7, wherein the drive carriage has a support bracket which supports the locking lever from underneath, and wherein the locking lever is profiled with a contour on its lower edge such that, during the entire path of the drive carriage from a front position which corresponds to the ventilation position of the cover into a position which corresponds to emergence of the catch element out of the catch recess, the locking element is pressed up into its locking position.

11. Motor vehicle roof as claimed in claim 4, wherein the link arrangement which couples the cover carrier to the drive carriage comprises at least one link bridge which projects on a side surface of the cover carrier and a grip section which extends around the link bridge and which is provided on the drive carriage.

12. Motor vehicle roof as claimed in claim 11, wherein the cover carrier has essentially a cross-sectional profile in the form of an inverted T with two side link bridges which are flush with the lower edge of the cover carrier, and wherein the grip section of the drive carriage has essentially the shape of a T-groove which is complementary to the cross sectional shape of the cover carrier.

13. Motor vehicle roof as claimed in claim 4, further comprising a tension and compression cable, wherein the drive carriage is coupled to the tension and compression cable, a drive carriage-side end of the tension and compression cable being provided with a catch that projects transversely relative to a longitudinal axis of the cable and which is insertable into a pocket formed on one side of the drive carriage.

* * * * *